US010882434B2

(12) United States Patent
Cusack et al.

(10) Patent No.: US 10,882,434 B2
(45) Date of Patent: Jan. 5, 2021

(54) PAYLOAD CARRYING MACHINE AND DUMP BODY LINKAGE

(71) Applicant: Caterpillar Global Mining LLC, Tucson, AZ (US)

(72) Inventors: Christopher C. Cusack, Forsyth, IL (US); Kris E. Seitz, Bethany, IL (US); Daniel R. Hettinger, Monticello, IL (US)

(73) Assignee: Caterpillar Global Mining LLC, Tucson, AZ (US)

( * ) Notice: Subject to any disclaimer, the term of this patent is extended or adjusted under 35 U.S.C. 154(b) by 0 days.

(21) Appl. No.: 15/967,978

(22) Filed: May 1, 2018

(65) Prior Publication Data

US 2019/0337437 A1 Nov. 7, 2019

(51) Int. Cl.
*B60P 1/16* (2006.01)
*B60P 1/28* (2006.01)
*B60P 1/06* (2006.01)
*B60P 1/30* (2006.01)

(52) U.S. Cl.
CPC .............. *B60P 1/286* (2013.01); *B60P 1/06* (2013.01); *B60P 1/16* (2013.01); *B60P 1/30* (2013.01)

(58) Field of Classification Search
CPC .... B60P 1/286; B60P 1/06; B60P 1/16; B60P 1/30
USPC ..... 298/17.5, 22 R, 22 AE, 22 J, 22 P, 22 D, 298/19 B; 105/261.2, 270, 273
See application file for complete search history.

(56) References Cited

U.S. PATENT DOCUMENTS

| 2,861,837 | A | * | 11/1958 | Morse ...................... B60P 1/18 298/20 A |
| 4,161,338 | A | | 7/1979 | Brown |
| 5,419,671 | A | | 5/1995 | Smith et al. |
| 7,032,957 | B2 | | 4/2006 | Miller et al. |
| 8,303,044 | B2 | | 11/2012 | Obermeyer |
| 9,815,413 | B2 | | 11/2017 | Rudnicki |
| 9,845,039 | B2 | | 12/2017 | Anderson et al. |
| 2009/0026667 | A1 | | 1/2009 | Charczuk |
| 2012/0212031 | A1 | | 8/2012 | Werner |
| 2016/0075267 | A1 | | 3/2016 | Ericsson |

FOREIGN PATENT DOCUMENTS

| CN | 2516499 Y | 10/2002 |
| CN | 101038046 A | 9/2007 |
| CN | 202557378 U | 11/2012 |
| JP | 2012210826 A | 11/2012 |

* cited by examiner

*Primary Examiner* — Stephen T Gordon
(74) *Attorney, Agent, or Firm* — Schwegman, Lundberg & Woessner

(57) ABSTRACT

Described herein are illustrative payload carrying machines and dump body linkage. An example vehicle can include a frame and a dump body movable relative to the frame. In the example vehicle, an articulation mechanism can be connected to both the dump body and the frame. The articulation mechanism can be a four-link system including a first pair of links can be coupled to the frame and dump body and a second pair of links can be coupled to the frame and dump body. The second pair of links can be longer than the first pair of links.

14 Claims, 9 Drawing Sheets

US 10,882,434 B2

PAYLOAD CARRYING MACHINE AND DUMP BODY LINKAGE

TECHNICAL FIELD

This disclosure is directed to payload carrying machines and, more particularly, to payload carrying machines and dump body supports.

BACKGROUND

Payload carrying machines, including trucks, are commonly employed during construction and excavation for transporting loads from one point to another. Payload carrying machines may comprise a body for holding material, often known as a dump body, which can be raised relative to a chassis of a machine and tipped about a pivot point to empty material held therein. The dump body position may be controlled by one or more lift actuators, commonly hydraulic, which may operate a hoist device which moves the dump body between a lowered position and a raised position. In the lowered position, the dump body may rest upon the chassis, and in the fully raised position, the body may be positioned at a maximum angle about the pivot point and relative to the chassis. See for example, U.S. Pat. No. 9,845,039, entitled "System and method of automatically operating a hoist system for a machine" and U.S. Pat. No. 7,032,957, entitled "Dump body for a work machine."

In payload carrying machines, such as off-highway trucks used in mining, the rear, or tail, of the dump body is a fixed distance from the pivot point connecting the dump body to the truck chassis. As such, the tail moves through a defined arc relative to the pivot point as the dump body is raised and lowered.

One challenge with truck body design is maintaining an acceptable tail height when the dump body is in its elevated, or raised, position. That is, it is desired that in the elevated position the dump body tail be at a vertical height approximately equal to, or above, a height of the truck's rear axle to avoid interference with the ground, or berm, during dump operations. Other truck design variables, such as the center of gravity of the truck, are higher priority and adversely affect the ability to maintain a desired tail dump clearance.

SUMMARY

Illustrative payload carrying machines and linkage are described herein. In one embodiment a vehicle includes a frame and a dump body movable relative to the frame. A linear actuator is connected at one end to the frame and at another end to the dump body. An articulation mechanism is spaced apart from the linear actuator and connected to both the dump body and the frame. The articulation mechanism includes a first link pivotally connected to the frame at a first pivot point and pivotally connected to the dump body at a second pivot point. The articulation mechanism also includes a second link pivotally connected to the frame at a third pivot point and pivotally connected to the dump body at a fourth pivot point. The first link is rotatable about the first and second pivot points and the second link is rotatable about the third and fourth pivot points.

In another embodiment, a vehicle includes a frame having a front and a rear and a dump body having a front and a rear. The dump body is movably connected to the frame. A lift actuator is coupled to the dump body and to the frame to move the front of the dump body between a lowered position and a raised position relative to the frame. A first link is pivotally connected to and configured to rotate relative to the dump body and the frame. The first link is pivotally connected to the frame at a first location. A second link is pivotally connected to and configured to rotate relative to the dump body and the frame. The second link is pivotally connected to the frame at a second location. The first position is disposed rearward of the second position relative to the rear of the frame, and the first link having a length, L1, which is less than a second length, L2, of the second link.

An embodiment of a dump body assembly includes a dump body, first and second pair of mounting brackets located on a bottom of the dump body, a first pair of links each having a mounting point coupled to one of the first pair of mounting brackets and a second pair of links each having a mounting point coupled to one of the second pair of mounting brackets. The first pair of links each have a length of distance L1, while the second pair of links each have a length of distance L2, where distance L1 is less than distance L2.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Figure 1:
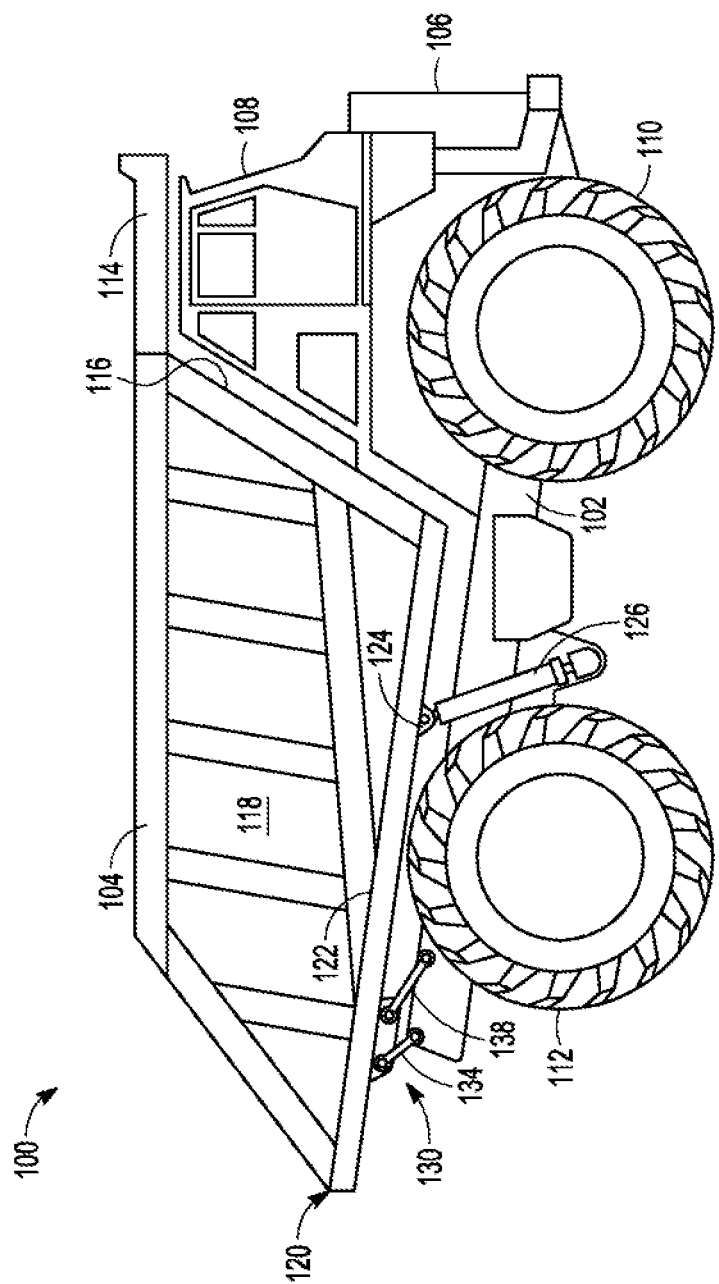
FIG. 1 shows an illustrative payload carrying machine, in accordance with at least one example.

An exemplary embodiment of a payload carrying machine 100, or vehicle, is illustrated in FIG. 1. The payload carrying machine 100 may be an off-highway truck used in mining operations. The payload carrying machine 100 includes a frame 102, and a dump body 104. The payload carrying machine may include an engine compartment 106 and an operator's cab 108. The engine compartment 106 may house an engine, a transmission, and/or other components used to power and/or transmit power to the payload carrying machine. The operator's cab 108 may include controls for operating and driving the payload carrying machine. The engine in the engine compartment 106 may drive front wheels 110 and/or rear wheels 112 through a transmission and drivetrain connected to the engine.

The dump body 104 is attached to and supported by the frame 102. Referring to FIG. 1, the dump body 104 may include a canopy 114, a front wall 116 (front), sidewalls 118, a tail 120 (rear) and a floor 122. It should be understood that the dump body 104 may vary from the exemplary dump body of FIG. 1. For example, other example dump bodies may not include a canopy, while others may have sidewalls that converge together and thereby form a floor or base of the dump body. Additional dump bodies, which vary in shape, size and other structural characteristics may also be used in examples according to this disclosure.

The front wall 116 may be located behind the operator's cab 108, extending between the canopy 114 and the floor 122. The front wall 116 may be substantially vertical (for example, in instances when vehicle 100 is disposed in a common orientation such as on a level horizontal section of ground or other surface) or angled from the floor to the canopy, and may be configured to withstand forces applied against it by a payload within the dump body 104. Sidewalls 118 (only one of which is shown in FIG. 1) may extend rearward from the front wall 116 to the tail 120. These may connect to the floor, along with the front wall, to form a box-like structure for receiving and carrying a payload. A tailgate (not shown) may be provided at the rear of the dump body 104 to prevent or inhibit a load from spilling during transport. The tail 120 of the dump body can be relatively planar with the floor 122 (as shown) or extend at an angle to the floor. For example, the tail 120 may extend upward from the floor.

As shown in FIG. 1, the dump body 104 is connected to the frame 102 by an articulating body support system 130. The articulating body support mechanism 130 is located toward the rear end of the dump body 104 including the tail 120. For purposes of orientation, the rear of the vehicle, the dump body and the frame are generally proximate to tail 120, while the front of the vehicle, the dump body and the frame are generally proximate to operator's cab 108.

Actuator brackets 124 may be provided on the underside of the dump body 104 and be positioned toward the front end of the dump body 104. A lift actuator 126, such as a hydraulic cylinder, may extend linearly between the frame 104 and the actuator brackets 124 and be actuated to raise a front end of the dump body 104 to dump a payload. Lift actuator can be any type of linear actuator and is not limited to hydraulic cylinder based lifts.

Figure 2A:
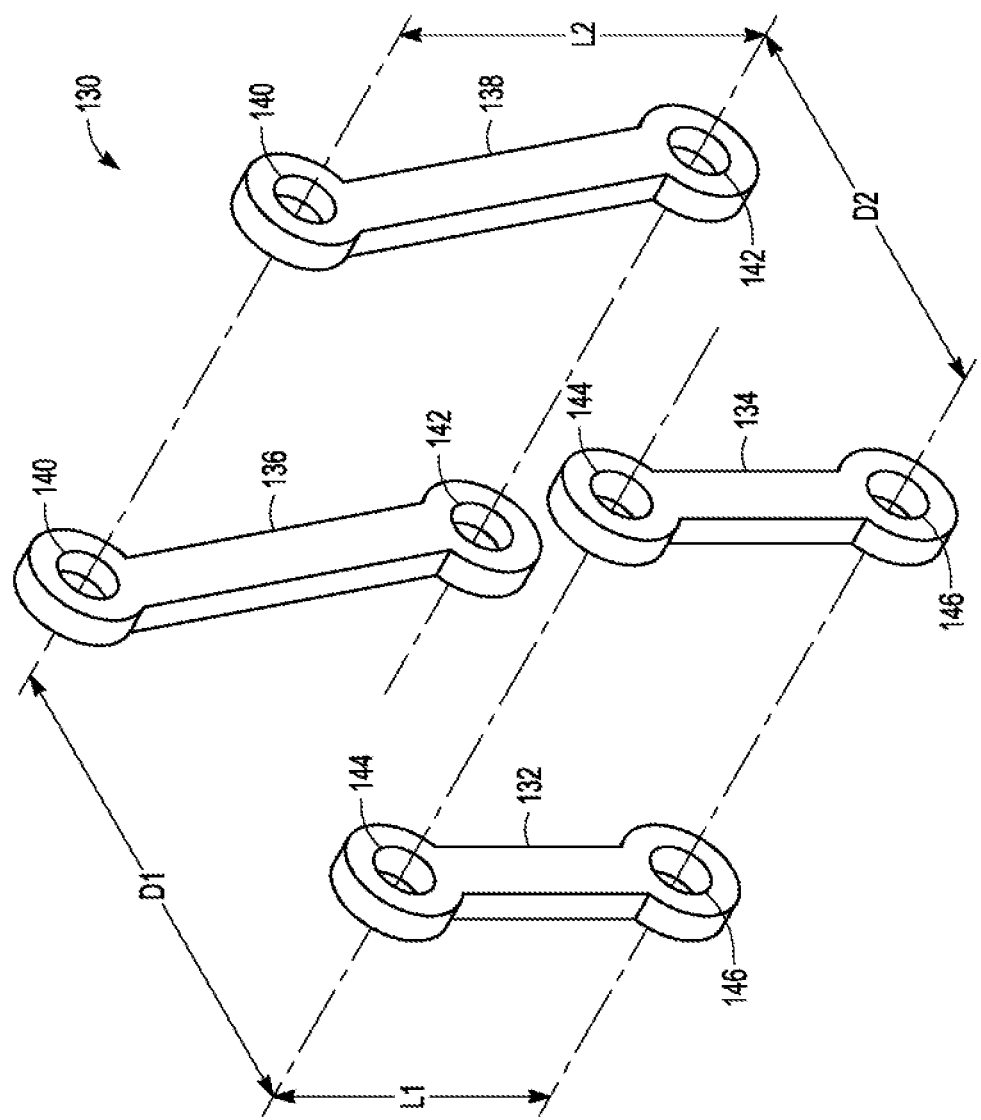
FIG. 2A illustrates links of an articulating body support mechanism.

Articulating body support mechanism 130 may include four links 132, 134, 136 and 138, as shown in FIG. 2A separated from the payload carrying machine. Each link includes a top mounting location 140, 144 and a bottom mounting location 142, 146. The top mounting locations 140, 144 are configured to be pivotally connected to the dump body of a vehicle, including, for example, dump body 104 of vehicle 100. The bottom mounting locations 142, 146 are configured to be pivotally connected to a frame or other component of the vehicle that remains stationary relative to the dump body, including, for example, frame 102 of vehicle 100 of FIG. 1. In one embodiment the top and bottom mounting locations are holes, or bores, adapted to receive a pin as explained in more detail below. It will be appreciated that only links 134 and 138 are shown in FIG. 1 as viewed from one side of the payload carrying machine. In some embodiments, the articulating body support mechanism can include a single pair of links. In other embodiments, two or more pairs of links can be included in the articulating body support mechanism, such as the two pair of links illustrated in FIG. 2A.

Links 132 and 134 can be the same or substantially the same in design specifications, such as length, thickness, hardness and profile shapes. In other cases, links 132 and 134 may differ, for example, in shape. In some cases, links of the articulating body support mechanism for a dump body may need to be shaped to avoid interference with neighboring components of the vehicle. In such instances, the shape of the arm may be designed to provide the required length link between two pivots and also may have a non-linear shape to avoid or allow placement and movement about other components without interference therewith. The distance between the top 144 and bottom 146 mounting locations of links 132, 134 are spaced apart by a length L1. Similarly, links 136 and 138 can be the same or substantially the same in design specifications, such as length, thickness, hardness and profile shapes. The distance between the top 140 and bottom 142 mounting locations of links 136, 138 are spaced apart by a length L2. In this embodiment length L2 is greater than length L1.

Links 132 and 134 are mounted to the dump body rearward of links 136 and 138. As shown in FIG. 2A, the axis of mounting locations 140 and 144 are spaced by a distance D1. This spacing is the same for both sides of the vehicle 100. That is, the distance between the dump body mounting locations of both links 132 and 136 is the same for the dump body mounting locations of both links 134 and 138.

Similarly, links 132 and 134 are mounted to the frame rearward of links 136 and 138. As shown in FIG. 2A, the axis of mounting locations 142 and 146 are spaced by a distance D2. This spacing is the same for both sides of the vehicle 100. That is, the distance between the frame mounting locations of both links 132 and 136 is the same for the frame mounting locations of both links 134 and 138. Distances D1 and D2 can be the same, but may be different for different vehicle designs.

Figure 2B:
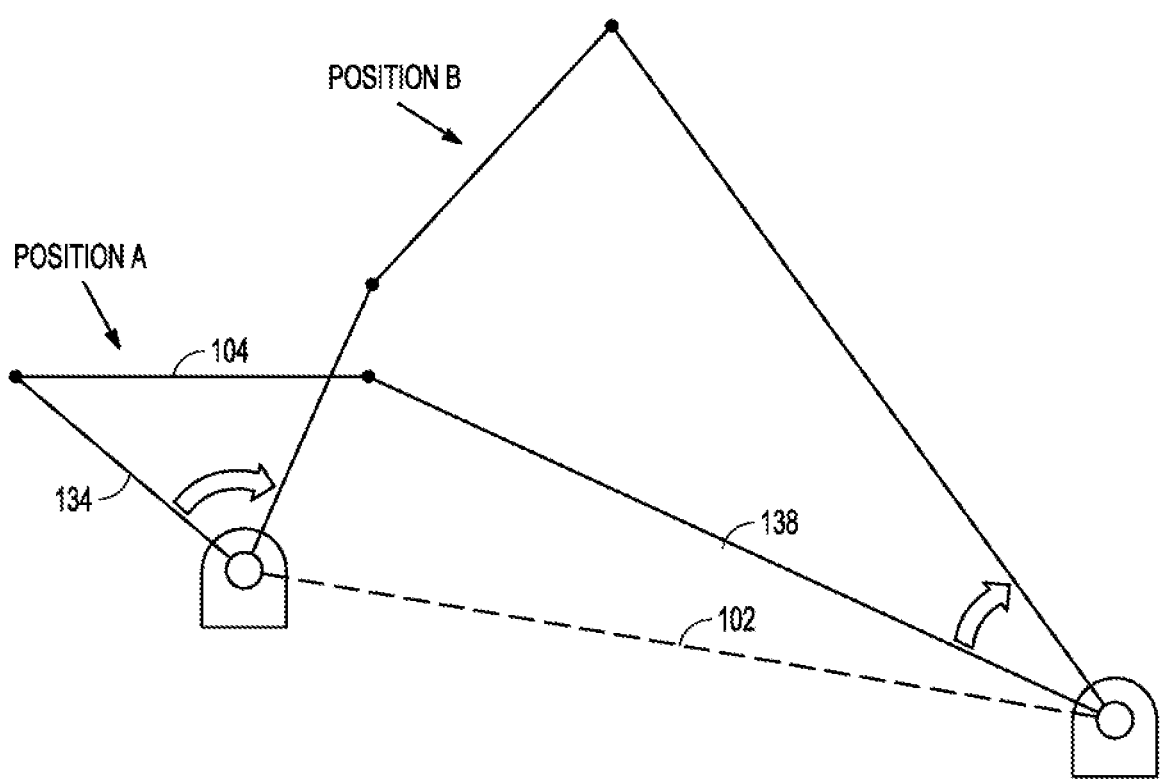
FIG. 2B is kinematic diagram of an example articulating body support mechanism.

FIG. 2B is a kinematic diagram, or joint map, of an example articulating body support mechanism 130. Two links, 134 and 138 are illustrated as anchored to frame 102. That is, frame 102 acts as the stationary ground bar while links 134, 138 and dump body 104 form the three-movable links which move between position A and position B in operation.

Figure 3:
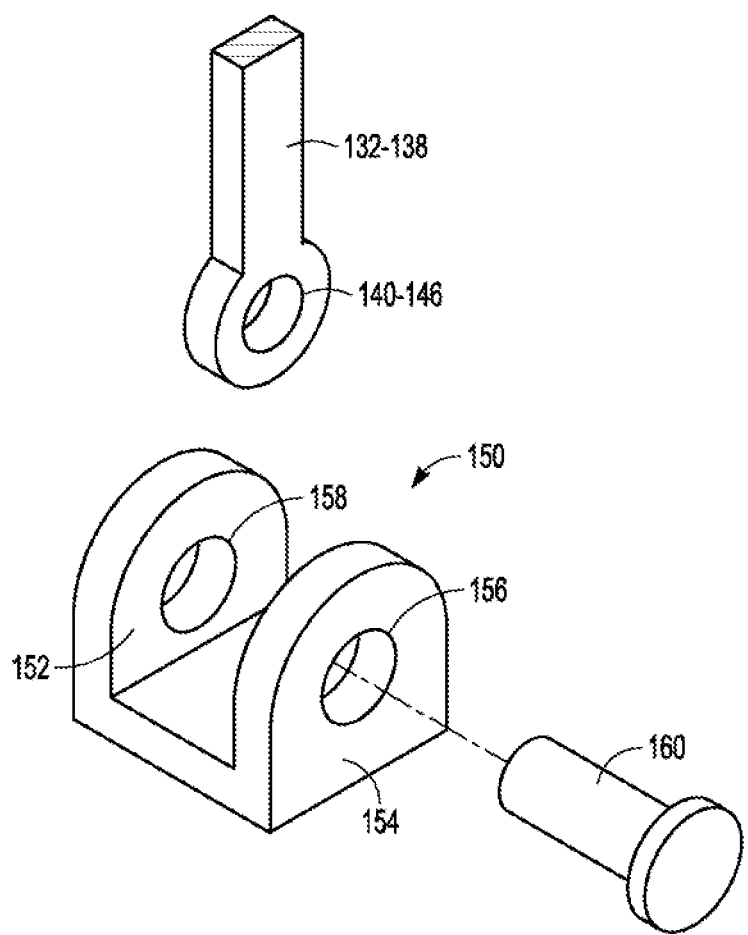
FIG. 3 illustrates an example mounting system for links of a payload carrying machine.

Referring to FIG. 3, an example mounting system is illustrated for links 132-138. Mounting bracket 150 includes a first plate 152 and a second plate 154. The plates are spaced apart to allow the link to fit between the plates. Bore holes 156 and 158 are sized and located to receive pin 160. When assembled, pin 160 passes through bore holes 156, 158 and mounting location 140-146 of link 132-138, respectively, to form a dynamic pin joint with a rotational axis defined by the pin.

In one embodiment, links 132-138 rotate around pin 160 and can include friction reducing or replaceable wear elements, known to those in the art, such as a sleeve, bearing, or grease fitting. Bore holes 156, 158 and pin 160 can be sized to create a press-fit between the pin and mounting bracket 150.

Figure 4:
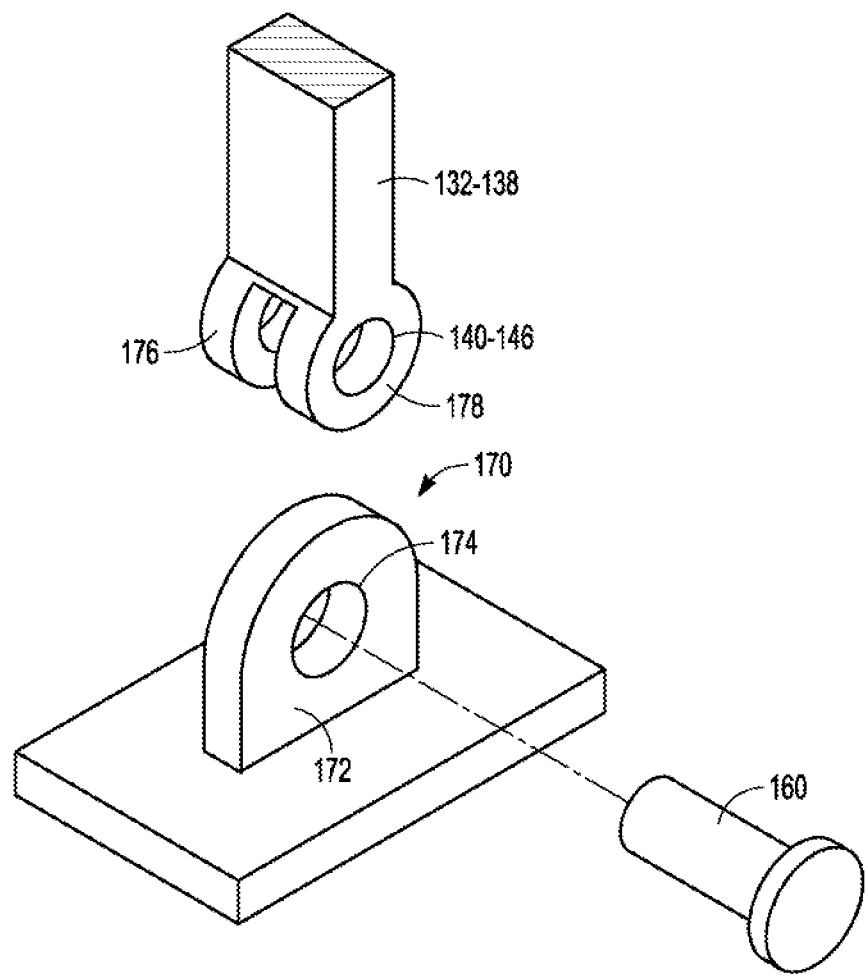
FIG. 4 illustrates an example mounting system for links of a payload carrying machine.

Referring to FIG. 4, another example mounting system is illustrated for links 132-138. Mounting bracket 170 includes a single plate 172 and bore hole 174. The link can include extensions 176 and 178 that are spaced apart to allow plate 172 to fit between the extensions. Bore hole 174 is sized and located to receive pin 160. When assembled, pin 160 passes through bore hole 174 and mounting location 140-146 of the link to form a dynamic pin joint with a rotational axis defined by the pin.

In one embodiment, pin 160 is press-fit into extensions 176 and 178 of the link and bore hole 174 is sized to allow pin 160 to rotate in bracket 170. Friction reducing or replaceable wear elements, known to those in the art, such as a sleeve, bearing, or grease fitting can be included with mounting bracket 170.

Figure 5:
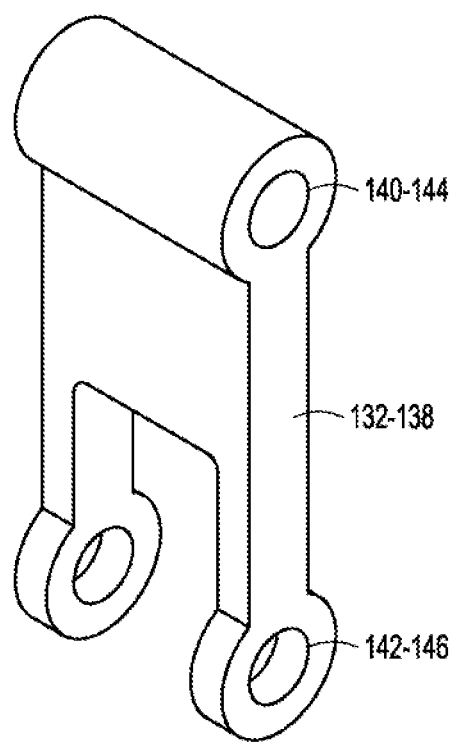
FIG. 5 illustrates an embodiment of a link of a payload carrying machine.
Figure 6:
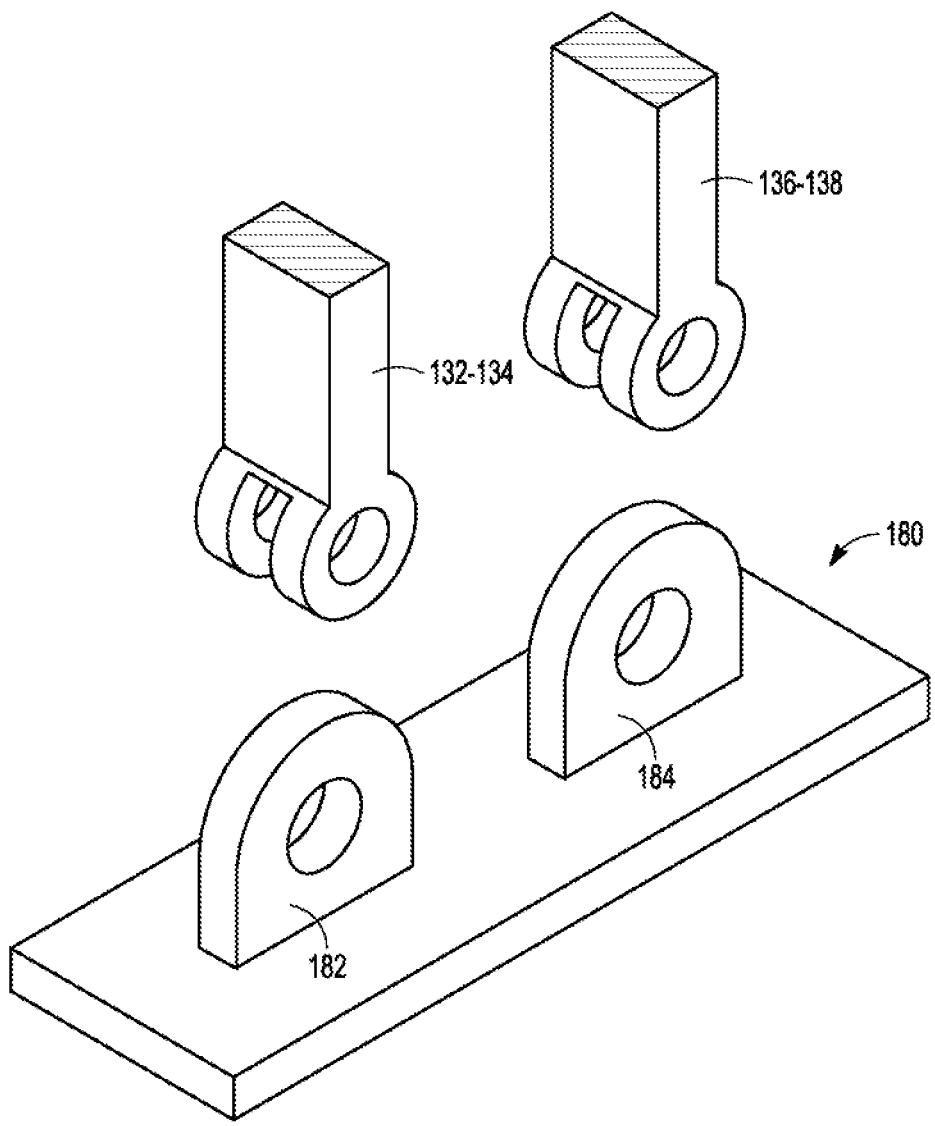
FIG. 6 illustrates an embodiment of a mounting bracket a payload carrying machine.

FIGS. 3 and 4 are illustrative of possible mounting systems to attach links 132-138 to the frame and dump body. It will be understood that different dynamic mounting systems, and combinations can be used. For example, the mounting system for links 132 and 134 can differ from the mounting system for links 136 and 138. Likewise, the mounting system for the frame may be different from the mounting system for the dump body. FIG. 5 illustrates an embodiment of a link 132-138 where mounting points 140, 144 are different than mounting points 142, 146. It will also be understood that multiple mounting brackets can be combined to reduce the number of brackets. FIG. 6 illustrates a single bracket 180 having two plates 182 and 184 to couple links 132, 134 and links 136, 138, respectively, to either the frame or dump body.

The mounting brackets are attached to the frame and dump body, or another appropriate structural feature of the payload carrying machine. The mounting brackets can be integrally formed or permanently attached (such as by welding) with structural components of the payload carrying machine and need not be separate or removable. For serviceability, however, the brackets can be removably attached to the payload carrying machine, for example using bolts or other mechanical fasteners. The term attached when used to describe the mounting brackets, therefore, includes integrally formed, permanent and removable attachment.

Figure 7A:
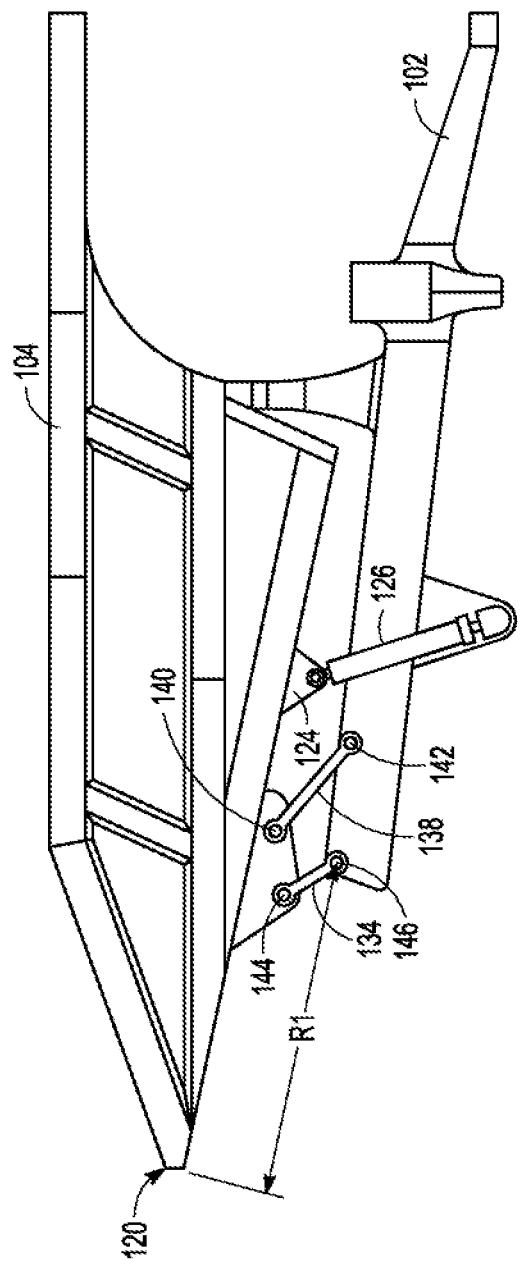
FIG. 7A illustrates components of a payload carrying machine in a first position.
Figure 7B:
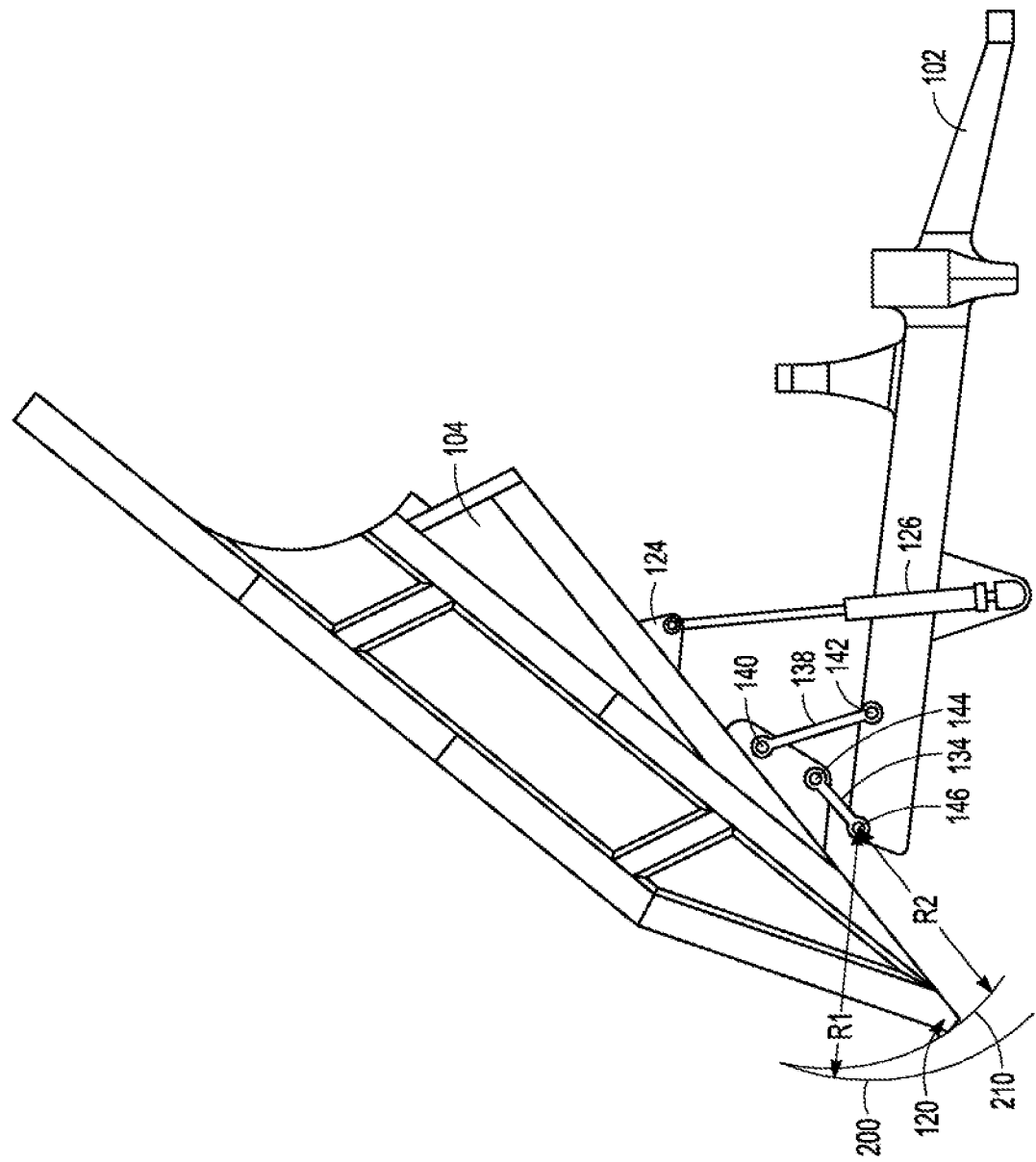
FIG. 7B illustrates components of a payload carrying machine in a second position.

FIG. 7A illustrates one embodiment with the dump body 104 in a down position resting on the frame 102, and FIG. 7B illustrates the dump body in an elevated, or raised, position in response to lift actuator 126 extending. In the down, or lowered, position, links 134 and 138 are both angled toward the rear of the payload carrying machine. Specifically, mounting location 140 is laterally rearward of mounting location 142, and mounting location 144 is laterally rearward of mounting location 146. In this embodiment, the dump body can be located more toward the rear of the payload carrying machine to move the center of gravity toward the rear of the vehicle. For example, it may be desirable to reduce weight on the front wheels of a mining truck by moving the center of gravity of a loaded truck toward the rear wheels 112 (see FIG. 1).

As illustrated in FIG. 7A, tail 120 of the dump body 104 in the down position (Position A of FIG. 2B) is a distance R1 from mounting location 146. As shown in FIG. 7B, the dump body is elevated to a position of approximately 45 degrees relative to horizontal (Position B of FIG. 2B). In the elevated position, the tail of the dump body is a distance R2 from mounting location 146, where R2 is less than R1. During the transition from the down position to the elevated position of the dump body, top mounting location 144 of link 134 rotates toward the front of the load carrier machine. That is, mounting position 144, in the elevated position, is forward of mounting position 146. As the dump body is elevated, tail 120 moves through a non-uniform arc and is effectively moved forward and raised away from the ground or berm, as the dump body is elevated. This is illustrated in FIG. 7B with the uniform arc 200 of radius R1 and the non-uniform arc 210.

INDUSTRIAL APPLICABILITY

The dump body linkage described herein may be used on payload carrying machines, such as mining trucks. The links provide an articulating connection between the dump body and the machine frame. The links described may allow the dump body to be located further rearward on the machine frame than conventional pivoting connections, thereby shifting the center of gravity toward rear wheels of the machine. The described links can increase the dump height of the dump body during operation of the machine by allowing the tail of dump body to move forward as the front of the dump body is elevated.

What is claimed is:

1. A vehicle comprising:
   a frame;
   a dump body movable relative to the frame;
   a linear actuator connected at one end to the frame and at another end to the dump body, the linear actuator configured to be actuated to position the dump body in a lowered position relative to the frame and to be actuated to position the dump body in a raised position relative to the frame; and
   an articulation mechanism spaced apart from the linear actuator and connected to the dump body and the frame, the articulation mechanism comprising:
   a first link pivotally connected to the frame at a first pivot point and pivotally connected to the dump body at a second pivot point; and
   a second link pivotally connected to the frame at a third pivot point and pivotally connected to the dump body at a fourth pivot point, the first link rotatable about the first and second pivot points and the second link rotatable about the third and fourth pivot points,
   wherein, in the lowered position, the first pivot point is forward of the second pivot point and the third pivot point is forward of the fourth pivot point, and
   wherein, in the raised position, the first pivot point is forward rearward of the second pivot point and the third pivot point is forward of the fourth pivot point.

2. The vehicle of claim 1, wherein a front end of the dump body being disposed a first distance from the frame in the lowered position and the front end of the dump body being disposed a second distance from the frame in the raised position, the first distance being less than the second distance.

3. The vehicle of claim 1, wherein a rear end of the dump body being disposed a first distance relative to the first pivot point in the lowered position and the rear end of the dump body being disposed a second distance relative to the first pivot point in the raised position.

4. The vehicle of claim 3, wherein the first distance is greater than the second distance.

5. The vehicle of claim 1, wherein a distance between the first and second pivot points of the first link is less than a distance between the third and fourth pivot points of the second link.

6. The vehicle of claim 5, wherein the third pivot point of the second link is located between the first pivot point of the first link and the linear actuator.

7. A vehicle comprising:
   a frame having a front and a rear;
   a dump body having a front and a rear, the dump body being movably connected to the frame;
   a lift actuator coupled to the dump body and to the frame, the lift actuator configured to move the front of the dump body between a lowered position and a raised position relative to the frame;
   a first link pivotally connected to the frame at a first pivot point and pivotally connected to the dump body at a second pivot point; and a second link pivotally connected to the frame at a third pivot point and pivotally connected to the dump body at a fourth pivot point, the first link having a length, L1, which is less than a second length, L2, of the second link, wherein, in the lowered position, the first pivot point is disposed forward of the second pivot point and the third pivot point is disposed forward of the fourth pivot point, and wherein, in the raised position, the first pivot point is disposed rearward of the second pivot point and the third pivot point is disposed forward of the fourth pivot point.

8. The vehicle of claim 7 where the first link is coupled to the dump body rearward of a location where the second link is coupled to the dump body.

9. The vehicle of claim 7 where the first link is coupled to the frame with a first pin joint and coupled to the dump body with a second pin joint.

10. The vehicle of claim 9 further comprises,
a first mounting bracket attached to the frame and adapted to couple the first link to the frame; and
a second mounting bracket attached to the dump body and adapted to couple the first link to the dump body.

11. The vehicle of claim 7 where the second link is coupled to the frame with a first pin joint and coupled to the dump body with a second pin joint.

12. The vehicle of claim 11 further comprises,
a first mounting bracket attached to the frame and adapted to couple the second link to the frame; and
a second mounting bracket attached to the dump body and adapted to couple the second link to the dump body.

13. The vehicle of claim 7 further comprising a mounting bracket attached to the frame and adapted to couple the first link and second link to the frame.

14. The vehicle of claim 7 further comprising a mounting bracket attached to the dump body and adapted to couple the first link and second link to the dump body.

* * * * *